United States Patent
Khurshid

(10) Patent No.: US 11,925,524 B1
(45) Date of Patent: Mar. 12, 2024

(54) DENTAL TOOTH GRASPER

(71) Applicant: KING FAISAL UNIVERSITY, Al-Ahsa (SA)

(72) Inventor: Zohaib Khurshid, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/206,863

(22) Filed: Jun. 7, 2023

(51) Int. Cl.
*A61C 3/14* (2006.01)
*A61C 13/12* (2006.01)
*B25B 5/10* (2006.01)

(52) U.S. Cl.
CPC .............. *A61C 3/14* (2013.01); *A61C 13/12* (2013.01); *B25B 5/102* (2013.01)

(58) Field of Classification Search
CPC .. A61C 3/14; A61C 3/12; B25B 5/102; B25B 5/068; B25B 5/16; B25B 1/24; B25B 1/142; B25B 1/145; B25B 1/147; B25B 5/142; B25B 5/145; B25B 5/147
See application file for complete search history.

(56) References Cited

U.S. PATENT DOCUMENTS

| | | | |
|---|---|---|---|
| 1,405,325 A * | 1/1922 | Posch | B25B 1/2426 269/258 |
| 3,111,760 A | 11/1963 | Semmelman et al. | |
| 3,644,998 A * | 2/1972 | Rubino | A61C 3/14 433/161 |
| 3,835,594 A * | 9/1974 | Szulman | B23Q 3/066 269/251 |
| 4,231,181 A | 11/1980 | Fabricant | |
| 4,812,127 A | 3/1989 | Hernandez | |
| 4,824,085 A * | 4/1989 | Buchler | B25B 5/16 269/221 |
| 5,232,370 A | 8/1993 | Hoye | |
| 5,306,141 A * | 4/1994 | Sears | A61D 5/00 433/154 |
| 5,933,936 A * | 8/1999 | Wand | A61B 5/150389 29/283 |
| 6,099,058 A * | 8/2000 | Asai | B25B 5/102 294/902 |
| 8,650,730 B2 * | 2/2014 | Sawdon | B21D 39/031 29/243.5 |
| 10,096,266 B2 | 10/2018 | Lee | |
| 10,096,267 B1 | 10/2018 | Al-Kahlan | |
| 10,354,557 B2 | 7/2019 | Maruyama et al. | |
| 2007/0037130 A1 | 2/2007 | Lee et al. | |
| 2012/0175799 A1 | 7/2012 | Karlsson et al. | |

(Continued)

*Primary Examiner* — Seahee Hong
(74) *Attorney, Agent, or Firm* — Nath, Goldberg & Meyer; Richard C. Litman

(57) ABSTRACT

An apparatus for grasping an object includes a base having a cylindrical wall, a circular plate attached to the base, and a screw configured to move a second section with respect to a first section of a circular plate. The circular plate includes the first section having a first face and the second section moveable with respect to the first section and having a second face opposite the first face. The first face and the second face each have at least one recess aligned to create at least one opening for grasping the object when the first face and the second face are brought into proximity with each other. Also disclosed is a method for grasping an object using the disclosed apparatus.

12 Claims, 5 Drawing Sheets

(56) References Cited

U.S. PATENT DOCUMENTS

| | | | |
|---|---|---|---|
| 2012/0306138 A1* | 12/2012 | Zhang | ................... B25B 5/163 269/244 |
| 2014/0024003 A1 | 1/2014 | Iwaki et al. | |
| 2017/0004736 A1 | 1/2017 | Lee | |
| 2023/0008280 A1* | 1/2023 | Lindsay | ................. B25B 1/241 |

* cited by examiner

DENTAL TOOTH GRASPER

BACKGROUND

Technical Field

The present disclosure relates to an apparatus for grasping an object, in particular an apparatus for grasping and holding an extracted tooth.

Background Art

Dentistry is a branch of medicine that primarily focuses on the mouth, teeth, and gums. Currently in dental schools, teaching is mainly based on delivering the knowledge, competencies, and skills for basic sciences, as well as clinical dentistry. To ensure that students have the preclinical skills necessary to work on actual patients in a clinical setting, several dental education tools are used, including phantom tooth heads, plastic teeth, and digital/computer simulations. Many dental schools across the world teach students using extracted teeth. Various exercises on the extracted teeth include how to drill into dentine and enamel for cavity preparation, as well as how to remove enamel for dental prosthetics like veneers, crowns, and bridges. For this preclinical activity, students place or embed the extracted tooth on dental gypsum, resin-based dental acrylic, or dental wax to practice. However, such set-up with an extracted tooth can lack stability for when the student is performing various exercises. Specifically, a tool for holding or grabbing the extracted tooth with a container for high-speed handpiece water is not provided for the preclinical exercises. Accordingly, there is a need in the art of teaching dentistry for an apparatus that aids dental students in learning to perform various tasks on an extracted tooth.

SUMMARY

The present disclosure relates generally to a method and a device primarily involved as a positioning and grasping aid for a dental student to use an extracted tooth as a teaching tool. The positioning and grasp aid is designed as a cap to a water reservoir that collects ejected water spray from a high-speed dental handpiece that the student is using to practice a known dental procedure such as crown preparation, cavity design, root canal preparation, tooth polishing, cavity excavation, etc. The cap of the dental tooth positioning and grasping aid has a section made of a metallic circular plate having a fixed portion and a moveable portion, with an opening running along one half of the metal plate's circumference and connecting to a slot down the middle of the metal plate. The slot is defined between the fixed portion of the circular plate and the moveable portion of the circular plate. The slot down the middle has at least one recess where a sample extracted tooth can be placed for the practice session. A screw along the side of the cap extends inwards towards the slot and, when tightened, holds the tooth in place.

In an embodiment, the present subject matter relates to an apparatus for grasping an object. The apparatus includes: a base having a cylindrical wall; a circular plate attached to the base, the circular plate including a first section having a first face and a second section moveable with respect to the first section and having a second face opposite the first face, wherein the first face and the second face each have at least one recess aligned to create at least one opening for grasping the object when the first face and the second face are brought into proximity with each other; and a screw configured to move the second section with respect to the first section.

In another embodiment, the present subject matter relates to a method for grasping an object. The method includes the step of providing an apparatus for grasping the object, the apparatus including a base having a cylindrical wall; a circular plate attached to the base, the circular plate including a first section having a first face and a second section moveable with respect to the first section and having a second face opposite the first face, wherein the first face and the second face each have at least one recess aligned to create at least one opening for grasping the object when the first face and the second face are brought into proximity with each other; and a screw configured to move the second section with respect to the first section;. The method further includes the steps of: moving the second section towards the first section by turning the screw; positioning the object to be grasped in the at least one opening as the second section is moved towards the first section; and discontinue moving the second section when the object is secured in the at least one opening.

Other features and steps of the present disclosure are described in greater detail below.

BRIEF DESCRIPTION OF THE DRAWINGS

Similar reference characters denote corresponding features consistently throughout the attached drawings.

DETAILED DESCRIPTION

The present disclosure is directed to an apparatus for use as a teaching aid for dental or dentistry students. One practical method for teaching dental students is to have them work in a clinical setting, thereby allowing them to learn and practice various exercises related to the care of teeth and gums. However, it is important that the students have some preclinical training so that they have competencies to perform the various tasks on live patients. To ensure that students have the preclinical skills necessary to work on live patients in a clinical setting, several dental education tools are used, including phantom tooth heads, plastic teeth, and digital/computer simulations. One of the best ways for students to sharpen their skills is to practice on extracted teeth. Various exercises on the extracted teeth include how to drill into dentine and enamel for cavity preparation, as well as how to remove enamel for dental prosthetics like veneers, crowns, and bridges.

Figure 1:
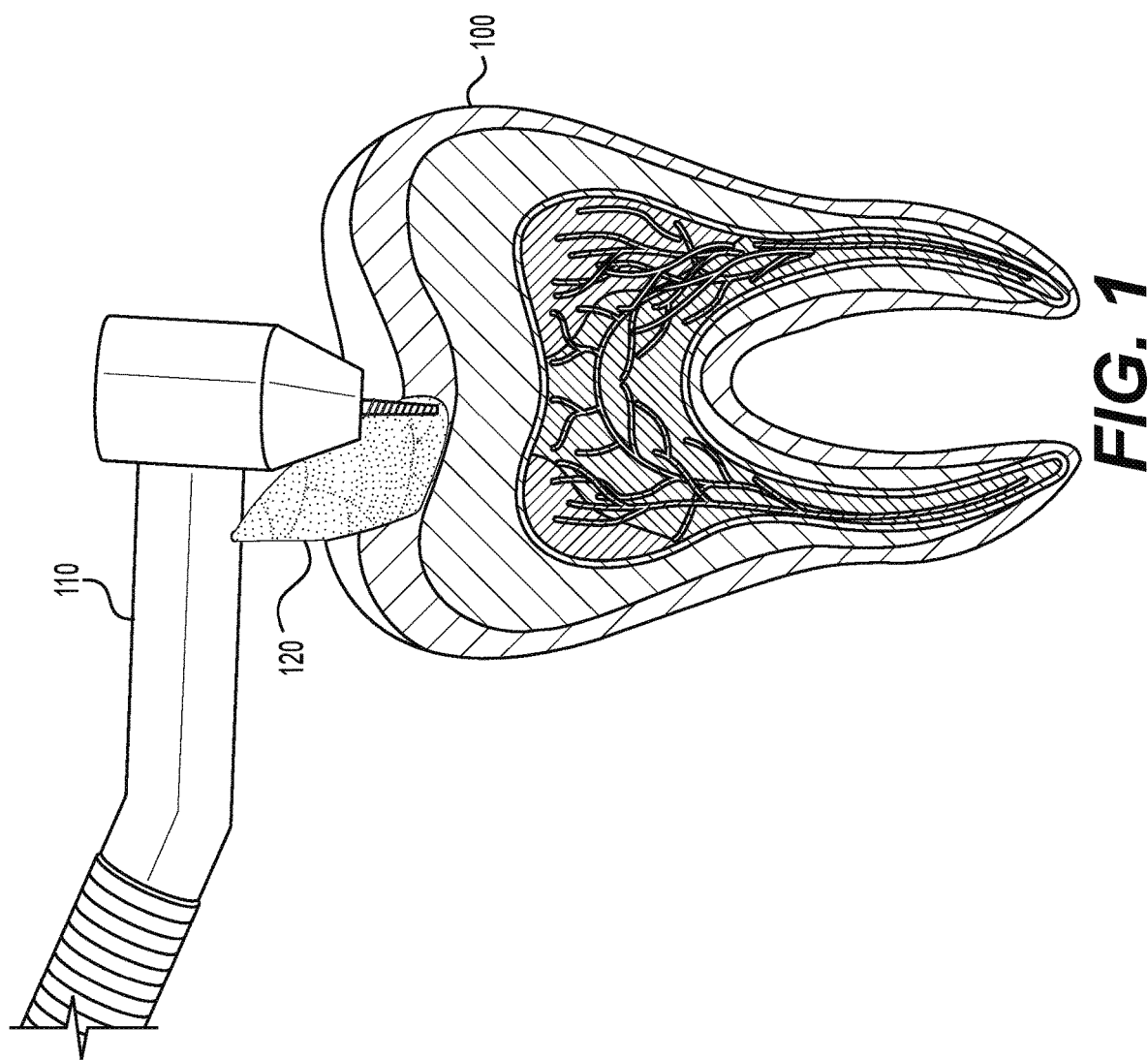
FIG. 1 depicts an extracted tooth being worked on with a dental handpiece.

FIG. 1 depicts an extracted tooth 100 being worked on by a dental handpiece 110. Depending on what is being practiced with the extracted tooth, dental handpiece 110 may include a water stream 120 to irrigate the section of the extracted tooth as enamel is being drilled or removed. Given the physical actions being performed on extracted tooth 100, it is important that extracted tooth 100 remain stable. In the past, students have placed or embedded the extracted tooth on dental gypsum, resin-based dental acrylic, or dental wax in order to practice the various skills. However, often there is a lack of stability when the extracted tooth is embedded in the various substances. Also, if stability is achieved, it may take a long time for the substance (gypsum, resin-based acrylic, wax, etc.) to properly set to support the extracted tooth.

Therefore, the present disclosure is directed to an apparatus for grasping an object. In a particular embodiment, the object to be grasped is an extracted tooth. The particular embodiment will be discussed with respect to FIGS. 2-4, with FIG. 5 disclosing an alternate embodiment. However, for ease of understanding, like reference numerals throughout FIGS. 2-5 (including the alternate embodiment) will be used and will reference like components in the disclosed apparatuses. It is understood that the use of the numerals in describing the figures and disclosed apparatus is not to be limiting to a particular embodiment, and that other configurations are contemplated within the scope of the present disclosure.

Figure 2:
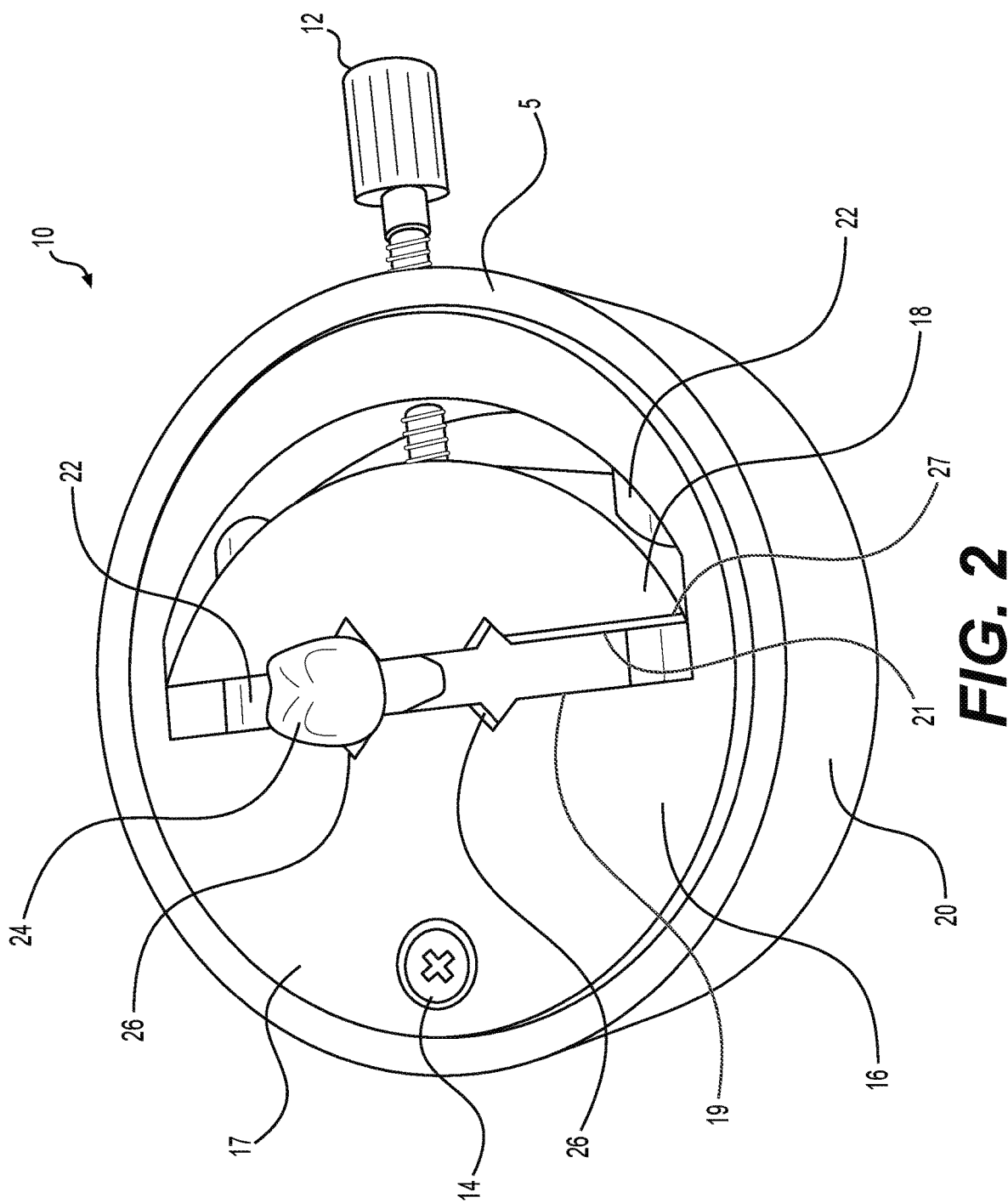
FIG. 2 is a top perspective view of a dental tooth grasper in accordance with an embodiment of the present disclosure.
Figure 3:
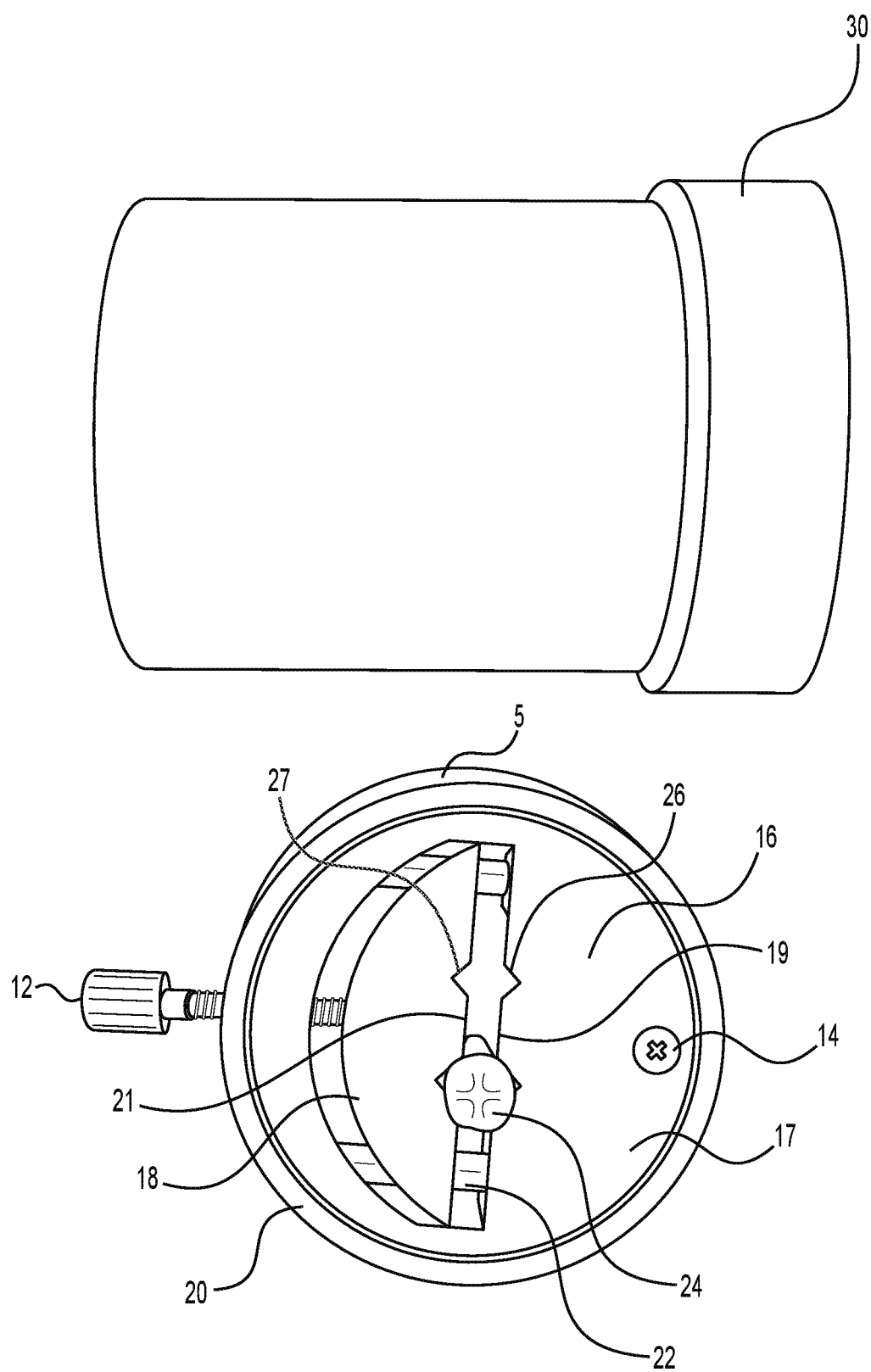
FIG. 3 is top perspective view of the dental tooth grasper of FIG. 2, shown with a side view of a water container on which the dental tooth grasper is placed.
Figure 4:
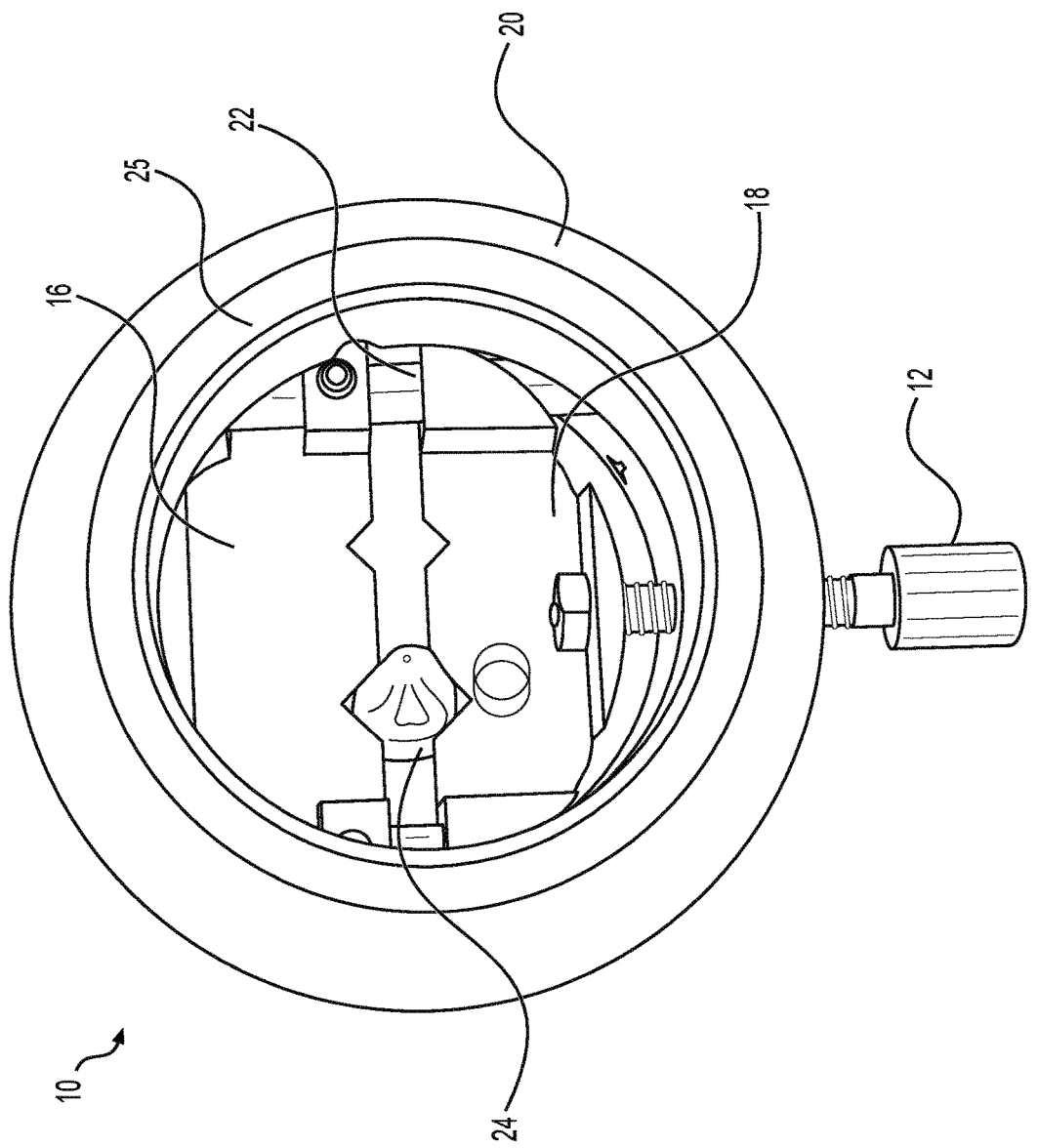
FIG. 4 is a bottom perspective view of the dental tooth grasper of FIG. 2.

Turning now to the embodiment depicted in FIGS. 2-4, dental tooth grasper 10 has a base 5 having a cylindrical wall 20. In a particular embodiment, dental tooth grasper 10 is designed as a cap to water reservoir 30. In looking particularly at FIG. 4, cylindrical wall 20 includes rim 25 which forms a male part to aid in forming a tight seal with water reservoir 30. Water reservoir 30 collects the water ejected from a dental handpiece being used by a student to practice various exercises on extracted tooth 24. The collection of the water ejected from the dental handpiece allows the user to perform the exercises on extracted tooth 24 with minimal mess.

In the embodiments shown herein, cylindrical wall 20 (including rim 25) is made of any type of suitable material. In a non-limiting example, cylindrical wall 16 is made of a plastic material, particularly of polytetrafluoroethylene. However, cylindrical wall can also be made of other materials, including wood or metal.

Figure 5:
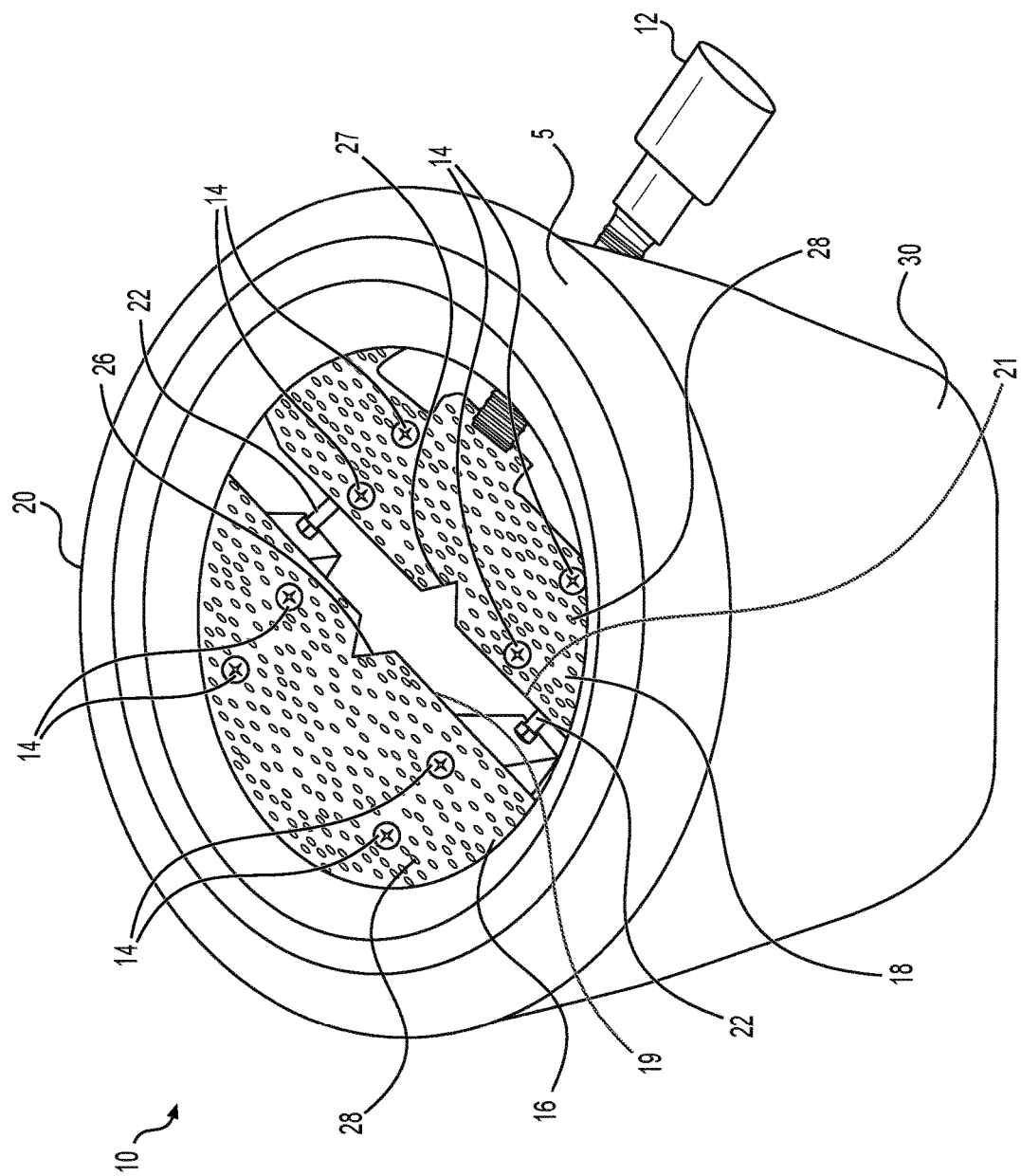
FIG. 5 is a top perspective view of a second embodiment of a dental tooth grasper in accordance with the present disclosure.

Dental tooth grasper 10 further includes circular plate 16 attached to base 5 via anchor screw 14. Anchor screw 14 attaches circular plate 16 to rim 25 of base 5. While the particular embodiment shown in FIGS. 2-4 depict a single anchor screw 14, more than one anchor screw 14 can be used for attaching circular plate 16 to base 5. For another example, the embodiment shown in FIG. 5 depicts a plurality of anchor screws 14 attaching circular plate 16 to base 5. In both cases, the number of anchor screws 14 are non-limiting, as any number of anchor screws 14 can be used.

Circular plate 16 includes first section 17 having first face 19 and second section 18 moveable with respect to first section 17 and having second face 21 opposite first face 19. First face 19 has at least one first recess 26 and second face 21 has at least one second recess 27. First recess 26 and second recess 27 are aligned to create at least one opening for grasping the object when first face 19 and second face 21 are brought into proximity with each other. The embodiment shown in FIGS. 2-4 depicts first face 19 and second face 21 having two first recesses 26 and two second recesses 27, respectively. In such a configuration, two openings will be formed when first face 19 is brought into close proximity to second face 21. As can be seen in the embodiment shown in FIG. 5, a single opening is formed when first face 19 is brought into close proximity to second face 21. It is contemplated that any number of recesses can be formed in first face 19 and second face 21, thereby forming any number of openings for grasping an object. In FIGS. 2-4, the object being grasped is extracted tooth 24.

Dental tooth grasper 10 further includes screw 12 configured to move second section 18 with respect to first section 17. Turning screw 12 clockwise and counterclockwise results in second face 21 of second section 18 moving towards and away from first face 19 of first section 17. Guide rails 22 support second section 18 and keep second section 18 properly aligned when moving towards and away from first section 17. In the embodiments described herein, two guide rails 22 are depicted to provide support and alignment of second section 18. However, it is also contemplated that a single guide rail would be sufficient to provide the necessary support and alignment. If a single guide rail is employed, it is contemplated that the single guide rail would be support second section 18 from its middle, namely being positioned towards the diameter of base 5.

Circular plate 16 and guide rails 22 are made of any suitable material, so long as the material provides the required structural integrity to stabilize extracted tooth 24 when being grasped. In most embodiments, circular plate 16 and guide rails 22 are made of the same material, however this is not required and they could be made of different materials. In the embodiments described herein, circular plate 16 and guide rails 22 are made of metal, particularly stainless steel. Likewise, screw 12 is also made of metal, particularly stainless steel. Stainless steel can be chosen because it will not rust or corrode in the presence of the water being ejected from the dental handpiece.

As indicated above, dental tooth grasper 10 is configured to act as a top for a water container used to collect the ejected water. Thus, base 5 is configured to mate with water container 30 as shown in the embodiment of FIG. 5. FIG. 3 depicts dental tooth grasper 10 and water container 30 in an unmated configuration. For the embodiments described herein, the material of water container 30 is the same as the material of cylindrical wall 20. For these embodiments, water container is made of plastic, particularly of polytetrafluoroethylene. However, it is also contemplated that water container 30 and cylindrical wall 20 are made of different materials, so long as the structure of cylindrical wall 20 and rim 25 enable proper mating with water container 30 to form a tight seal so there is no leakage of the water.

An advantage of the present dental tooth grasper is that it can be paired with the water container to capture water ejected from a dental handpiece. Gaps between first section 17 and second section 18 allow water to drain from the top into water container 30. If better water drainage is desired, circular plate 16 can also contain holes therein. FIG. 5 shows an embodiment with a plurality of holes 28 being located in circular plate 16. As shown in the figure, both first section 17 and second section 18 contain holes for added drainage of the water. It is contemplated, though, that holes 28 can be present on either or both sections 17, 18.

The present disclosure is also directed to a method for grasping an object, particularly an extracted tooth. The method includes a step of providing an apparatus for grasping the object. The apparatus used to grasp the object is described in detail above, but for clarity includes a base having a cylindrical wall, a circular plate attached to the base, and a screw configured to move a second section with respect to a first section of the circular plate. The method for grasping an object also includes the steps of moving the second section towards the first section by turning the screw, positioning the object to be grasped in at least one opening as the second section is moved towards the first section, and discontinue moving the second section when the object is secured in the at least one opening. The steps of beginning to move the second section towards the first section and positioning the object to be grasped are interchangeable, meaning that it is not necessary to start turning the screw to move the second section before positioning the object to be grasped in the opening being formed. The object can be positioned prior to beginning to turn the screw and move the second section.

The apparatus used in the method of the present disclosure can contain the elements and details as described above with respect to the various embodiments. In particular, the circular plate of the dental tooth grasper provided in the inventive method includes a first section having a first face and a second section moveable with respect to the first section and having a second face opposite the first face. The first face and the second face each have at least one recess aligned to create at least one opening for grasping the object when the first face and the second face are brought into proximity with each other by turning the screw. The apparatus also includes at least one rail supporting the second section and configured to keep the second section aligned when moving with respect to the first section.

Closing Statement

It will be understood that many additional changes in the details, materials, steps and arrangement of parts, which have been herein described and illustrated to explain the nature of the subject matter, may be made by those skilled in the art within the principle and scope of the invention as expressed in the following claims.

What is claimed is:

1. A system for grasping an object comprising:
an apparatus for grasping the object, the apparatus comprising
a base having a cylindrical wall;
a circular plate attached to the base, the circular plate comprising a first section having a first face and a second section moveable with respect to the first section and having a second face opposite the first face, wherein the first face and the second face each have at least one recess aligned to create at least one opening for grasping the object when the first face and the second face are brought into proximity with each other;
a screw configured to move the second section with respect to the first section; and
a water container,
wherein the cylindrical wall of the base is configured to mate with the water container.

2. The system as claimed in claim 1, further comprising:
at least one rail supporting the second section and configured to keep the second section aligned when moving with respect to the first section.

3. The system as claimed in claim 2, further comprising two of the rails supporting the second section and configured to keep the second section aligned when moving with respect to the first section.

4. The system as claimed in claim 1, wherein the circular plate comprises a plurality of holes.

5. The system as claimed in claim 1, wherein the first face and the second face each comprise two of the recesses aligned to create two of the openings for grasping objects when the first face and the second face are brought into proximity with each other.

6. The system as claimed in claim 1, wherein the object is an extracted tooth.

7. A method for grasping an object comprising:
providing an apparatus for grasping the object, the apparatus comprising
a base having a cylindrical wall;
a circular plate attached to the base, the circular plate comprising a first section having a first face and a second section moveable with respect to the first section and having a second face opposite the first face, wherein the first face and the second face each have at least one recess aligned to create at least one opening for grasping the object when the first face and the second face are brought into proximity with each other; and
a screw configured to move the second section with respect to the first section; and
a water container,
wherein the cylindrical wall of the base is configured to mate with the water container;
moving the second section towards the first section by turning the screw;
positioning the object to be grasped in the at least one opening as the second section is moved towards the first section; and
discontinue moving the second section when the object is secured in the at least one opening.

8. The method as claimed in claim 7, wherein the apparatus further comprises at least one rail supporting the second section and configured to keep the second section aligned when moving with respect to the first section.

9. The method as claimed in claim 8, wherein the apparatus further comprises two of the rails supporting the second section and configured to keep the second section aligned when moving with respect to the first section.

10. The method as claimed in claim 7, wherein the circular plate comprises a plurality of holes.

11. The method as claimed in claim 7, wherein the first face and the second face each comprise two of the recesses aligned to create two of the openings for grasping objects when the first face and the second face are brought into proximity with each other.

12. The method as claimed in claim 7, wherein the object is an extracted tooth.

* * * * *